(No Model.)

W. KNIGHT.
LOOM TEMPLE.

No. 468,349. Patented Feb. 9, 1892.

WITNESSES.
William M Brown
George P Cressy

INVENTOR.
Webster Knight
per D. M. Small, his atty.

UNITED STATES PATENT OFFICE.

WEBSTER KNIGHT, OF NATICK, RHODE ISLAND.

LOOM-TEMPLE.

SPECIFICATION forming part of Letters Patent No. 468,349, dated February 9, 1892.

Application filed June 5, 1891. Serial No. 395,185. (No model.)

*To all whom it may concern:*

Be it known that I, WEBSTER KNIGHT, of Natick, in the county of Kent and State of Rhode Island, have invented an Improvement in Loom-Temples, whereby the spattering and dripping of oil therefrom are kept from the cloth as it passes from the temple to the cloth-roll, and which has long been a source of annoyance and loss, often occasioning much damage, of which the following is a specification.

It is necessary that such a device be easily removable for oiling, cleaning, and other necessary repairs of the temple; that it be made and attached thereto so as not to interfere with the oscillating motion of the movable part of the temple, and that it combine a receptacle for holding the oil which drips from the bearing G and a shield to catch what spatters therefrom while in operation. My device fully covers these points, as shown in accompanying drawings, which form a part of this specification, and in which—

Figure 1:
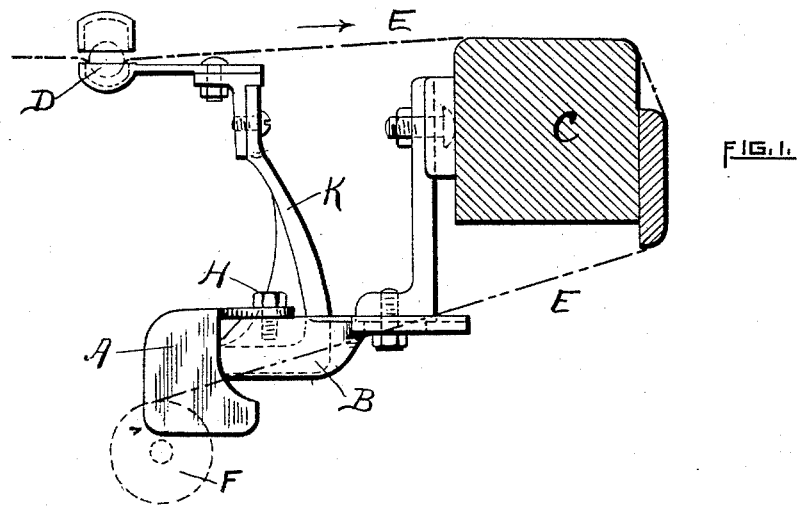
Figure 2:
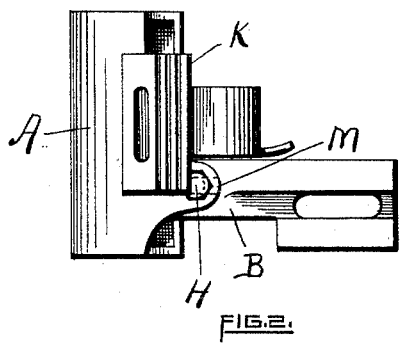
Figure 3:
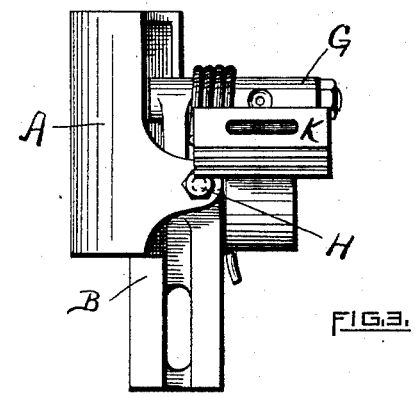

Figure 1 represents an end view thereof, A as attached to a temple showing also section of breast-beam C and end view of temple-roll D, with dotted lines E E representing edge of cloth passing from temple-roll to cloth-roll F. This view also shows bracket secured to breast-beam for supporting-arm B, to which is hinged the temple proper, this arm extending out from the beam at right angles to the bracket. Fig. 2 is a top or plan view of the temple alone with my device in same position as shown in Fig. 1, but showing a modified means of securing it to the arm B. Fig. 3 represents it swung to one side, disclosing the part or bearing G of the temple, which has to be well and frequently oiled and from which the cloth needs protection as the arm K of the temple rapidly snaps back and forth while the cloth is passing in close proximity thereto, often coming against it as the roll enlarges.

My device is made hollow, preferably of cast-iron, with an oblong opening in the side for receiving hinge G of the temple-bar K and having an extension on same side by which it can be secured to the stationary arm B at point H by means of a bolt, so that it is free to swing to one side, as shown in Fig. 3. It may contain a slot M, as indicated by dotted lines in Fig. 2, so as to slide into position or be otherwise secured to temple instead of swinging on bolt H. The latter method, however, will be found the most simple and practical.

I claim as my invention—

In a loom-temple, the combination, with the stationary arm B and the temple-bar K, hinged thereto, of a shield A, movably attached to the stationary arm B and inclosing the hinged joint connecting the arm B and temple-bar K, substantially as and for the purpose set forth.

WEBSTER KNIGHT.

Witnesses:
 GEORGE L. ROCKWELL,
 DEXTER M. SMALL.